United States Patent
Zheng et al.

(10) Patent No.: US 11,449,805 B2
(45) Date of Patent: Sep. 20, 2022

(54) TARGET DATA PARTY SELECTION METHODS AND SYSTEMS FOR DISTRIBUTED MODEL TRAINING

(71) Applicant: ALIPAY (HANGZHOU) INFORMATION TECHNOLOGY CO., LTD., Zhejiang (CN)

(72) Inventors: Longfei Zheng, Hangzhou (CN); Chaochao Chen, Hangzhou (CN); Yinggui Wang, Hangzhou (CN); Li Wang, Hangzhou (CN); Jun Zhou, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/498,978

(22) Filed: Oct. 12, 2021

(65) Prior Publication Data

US 2022/0114492 A1 Apr. 14, 2022

(30) Foreign Application Priority Data

Oct. 12, 2020 (CN) .......................... 202011082434.2

(51) Int. Cl.
*G06N 20/00* (2019.01)

(52) U.S. Cl.
CPC .................... *G06N 20/00* (2019.01)

(58) Field of Classification Search
CPC ......... G06N 20/00; G06K 9/62; G06K 9/6256
See application file for complete search history.

(56) References Cited

U.S. PATENT DOCUMENTS

| 2018/0018590 A1* | 1/2018 | Szeto | G06F 21/6254 |
| 2021/0067339 A1* | 3/2021 | Schiatti | H04L 9/006 |

(Continued)

FOREIGN PATENT DOCUMENTS

| CN | 110442457 | 11/2019 |
| CN | 111027715 | 4/2020 |

(Continued)

OTHER PUBLICATIONS

Lyu, "Towards Fair and Privacy-Preserving Federated Deep Models", IEEE Transactions on Parallel and Distributed Systems, vol. 31, No. 11, Nov. 2020, Manuscript received Oct. 3, 2019; revised May 1, 2020; accepted May 16, 2020. Date of publication May 21, 2020; date of current version Jun. 1, 2020. (Year: 2020).*

(Continued)

*Primary Examiner* — Dave Misir
(74) *Attorney, Agent, or Firm* — Fish & Richardson P.C.

(57) ABSTRACT

A computer-implemented method, medium, and system are disclosed. One example computer-implemented method performed by a server includes obtaining training task information from a task party. The training task information includes information about a to-be-pretrained model and information about a to-be-trained target model. A respective task acceptance indication from each of at least one of a plurality of data parties is received to obtain a candidate data party set. The information about the to-be-pretrained model is sent to each data party in the candidate data party set. A respective pre-trained model of each data party is received. A respective performance parameter of the respective pre-trained model of each data party is obtained. One or more target data parties from the candidate data party set is determined. The information about the to-be-trained target model is sent to the one or more target data parties to obtain a target model.

17 Claims, 4 Drawing Sheets

(56) References Cited

U.S. PATENT DOCUMENTS

| | | | |
|---|---|---|---|
| 2021/0089819 A1* | 3/2021 | Tschiatschek | G06F 21/6245 |
| 2021/0089878 A1* | 3/2021 | Greenewald | G06N 3/082 |
| 2021/0158099 A1* | 5/2021 | Tuor | G06Q 10/103 |
| 2021/0304062 A1* | 9/2021 | Rajamoni | G06N 20/00 |
| 2021/0374617 A1* | 12/2021 | Chu | G06N 20/20 |

FOREIGN PATENT DOCUMENTS

| | | | | |
|---|---|---|---|---|
| CN | 111222647 A | * | 6/2020 | G06N 20/00 |
| CN | 111444019 | | 7/2020 | |
| CN | 111652381 | | 9/2020 | |

OTHER PUBLICATIONS

Zhang, "Hierarchically Fair Federated Learning", May 1, 2020. (Year: 2020).*

Yu, "A Fairness-aware Incentive Scheme for Federated Learning", AIES '20, Feb. 7-8, 2020, New York, NY, USA. (Year: 2020).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

TARGET DATA PARTY SELECTION METHODS AND SYSTEMS FOR DISTRIBUTED MODEL TRAINING

CROSS-REFERENCE TO RELATED APPLICATIONS

This application claims priority to Chinese Patent Application No. 202011082434.2, filed on Oct. 12, 2020, which is herein incorporated by reference in its entirety.

TECHNICAL FIELD

One or more embodiments of the present specification relate to multi-party model training, and in particular, to target data party selection methods and systems for distributed model training.

BACKGROUND

In the fields of data analysis, data mining, economics forecast, etc., distributed model training can be applied to a scenario in which a machine learning model is cooperatively trained for use by a plurality of parties while data security of the plurality of parties is ensured. In distributed model training, it is expected that training data held by a plurality of data parties is more suitable for target model training. In addition, in some application scenarios, a party that holds no data (or referred to as a task party) expects to participate in distributed model training through benefit allocation methods other than data sharing to obtain a target model that satisfies its service needs, and a party that holds data expects to obtain additional benefits in addition to data sharing.

Therefore, it is necessary to provide a target data party selection method for distributed model training to select a data party that is more suitable for a training task for model training.

SUMMARY

An aspect of the present specification provides a target data party selection method for distributed model training. A target data party is to participate in distributed model training to obtain a target model, and the method includes: obtaining training task information from a task party, where the training task information includes information about a to-be-pretrained model and information about a to-be-trained target model; receiving a task acceptance indication from at least one of a plurality of data parties, to obtain a candidate data party set, where the candidate data party set includes a data party that sends the task acceptance indication; sending the information about the to-be-pretrained model to each data party in the candidate data party set; obtaining a pre-trained model of each data party, where the pre-trained model of each data party is obtained by each data party through model training based on a training sample held by the data party and the information about the to-be-pretrained model; obtaining a performance parameter of each pre-trained model; determining one or more target data parties from the candidate data party set based on at least the performance parameter of each pre-trained model; and sending the information about the to-be-trained target model to each target data party, to obtain the target model through cooperative training with each target data party.

Another aspect of the present specification provides a target data party selection system for distributed model training. The system is implemented by a server in participants. The participants include a plurality of data parties, a task party, and the server. The system includes: a training task information acquisition module, configured to obtain training task information from the task party, where the training task information includes information about a to-be-pretrained model and information about a to-be-trained target model; a candidate data party set determining module, configured to receive a task acceptance indication from at least one of the plurality of data parties, to obtain a candidate data party set, where the candidate data party set includes a data party that sends the task acceptance indication; a module for sending information about a to-be-pretrained model, configured to send the information about the to-be-pretrained model to each data party in the candidate data party set; a pre-trained model acquisition module, configured to obtain a pre-trained model of each data party, where the pre-trained model of each data party is obtained by each data party through model training based on a training sample held by the data party and the information about the to-be-pretrained model; a performance parameter acquisition module, configured to obtain a performance parameter of each pre-trained model; a target data party determining module, configured to determine one or more target data parties from the candidate data party set based on at least the performance parameter of each pre-trained model; and a module for cooperative training of a target model, configured to send the information about the to-be-trained target model to each target data party, to obtain the target model through cooperative training with each target data party.

Another aspect of the present specification provides a target data party selection apparatus for distributed model training. The apparatus includes a processor and a memory. The memory is configured to store instructions. The processor is configured to execute the instructions to implement the target data party selection method for distributed model training.

BRIEF DESCRIPTION OF DRAWINGS

The present specification is further described by using example embodiments, and these example embodiments are described in detail by using the accompanying drawings. These embodiments are not limiting. In these embodiments, the same reference numerals represent the same structure.

DESCRIPTION OF EMBODIMENTS

To describe the technical solutions in the embodiments of the present specification more clearly, the following briefly describes the accompanying drawings needed for describing the embodiments. Clearly, the accompanying drawings in the following description are merely some examples or embodiments of the present specification. For those of ordinary skill in the art, the present specification can be applied to other similar scenarios based on these accompanying drawings without creative efforts. Unless it is clear from a language environment or otherwise specified, the same reference numerals in the figures represent the same structure or operation.

It should be understood that words such as "system", "apparatus", "unit", and/or "module" used in the present specification are a method for distinguishing between different elements, components, parts, or assemblies at different levels. However, if other words can achieve the same objective, the words can be replaced by other expressions.

As shown in the present specification and claims, words such as "a", "an", "one", and/or "the" do not specifically refer to a singular form, but can also include a plural form, unless otherwise specified in the context clearly. In general, the terms "include" and "comprise" merely indicate that the steps and elements that are clearly identified are included, and these steps and elements do not constitute an exclusive list, and the method or device may further include other steps or elements.

A flowchart is used in the present specification to describe operations performed by a system according to embodiments of the present specification. It should be understood that the operations are not necessarily performed exactly in order. Instead, the steps can be processed in a reverse order or processed simultaneously. In addition, other operations can be added to these processes, or one or more operations can be removed from these processes.

Data processing and analysis such as data analysis, data mining, and trend prediction are widely used in more and more scenarios for a large amount of information data in various industries such as economy, culture, education, medical treatment, and public management. A plurality of data owners can obtain a better data processing result through data cooperation. For example, model parameters with better performance can be obtained by integrating data from the plurality of data owners through distributed model training.

In some embodiments, distributed model training can be applied to a scenario in which parties cooperatively train a machine learning model for use by the plurality of parties while data security of the parties is ensured. In this scenario, the plurality of data parties hold their own data, and want to use data of each other for unified modeling (for example, a classification model, a linear regression model, or a logistic regression model), but do not want their own data (especially private data) to be disclosed. For example, Internet savings institution A holds a batch of user data and bank B holds another batch of user data, and a machine learning model with better performance can be obtained through training based on a training sample set determined based on the user data of A and B. Both A and B are willing to jointly participate in model training by using the user data of each other, but A and B are unwilling to disclose their user data information for some reasons, or at least unwilling to let each other know their user data information. A typical distributed model training can be federated learning-based model training.

In some embodiments, in distributed model training, data held by some data parties contributes less to model training jointly performed by a plurality of parties or even negatively affects a model training process due to differences in data held by the data parties. In some other application scenarios, a party that holds no data (or referred to as a task party) expects to participate in distributed model training through benefit allocation methods other than data sharing to obtain a target model that satisfies its service needs, and a party that holds data also expects to obtain additional benefits in addition to data sharing. For example, the task party holds no data to participate in distributed model training, but is willing to provide financial incentives to the data party to obtain the target model obtained by the plurality of parties through joint training, and the data party also expects to obtain additional benefits through distributed model training. However, not all data of any data party is suitable for training of the target model, and the data party needs to be screened based on a training task. Therefore, before the target model is formally trained through distributed model training, training data of each data party usually needs to be screened by using a certain method, to select an appropriate data party to participate in subsequent formal training.

In some embodiments of the present specification, before the target model is trained, a server in participants of a distributed training task can screen, based on the training task, the data held by each data party, to select an appropriate data party to participate in training. Specifically, the server can provide a to-be-pretrained model for all candidate data parties intended to participate in training, and each candidate data party can train the to-be-pretrained model based on data held by the candidate data party, to obtain a pre-trained model, and upload the pre-trained model to the server. Further, the server can perform screening based on a model performance parameter of the pre-trained model provided by each candidate data party, to select a target data party whose model performance parameter satisfies a predetermined requirement to participate in formal training of the target model. After confirming the target data party, the server sends the to-be-trained target model to each target data party, and each target data party can formally perform distributed training of the target model, for example, federated learning-based model training. The target model can be a machine learning model determined based on specific needs, and includes but is not limited to a face recognition model, an object recommendation model, a benefit prediction model, etc. Correspondingly, a training sample in the embodiments of the present specification can include but is not limited to one or a combination of image data, text data, video data, audio data, etc.

Figure 1:
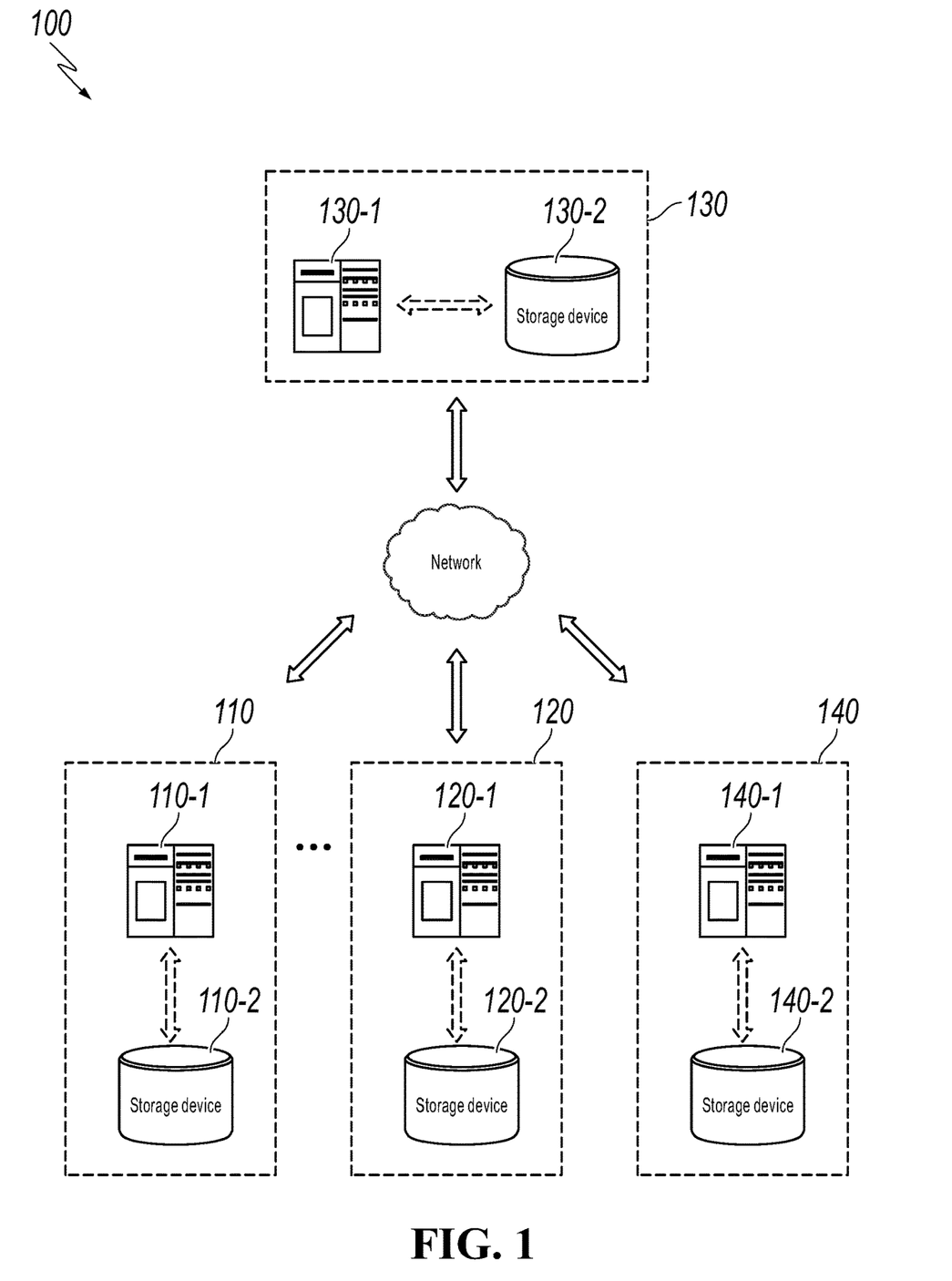
FIG. 1 is a diagram illustrating an example application scenario of a target data party selection method for distributed model training, according to some embodiments of the present specification.

FIG. 1 is a diagram illustrating an example application scenario of a target data party selection method for distributed model training, according to some embodiments of the present specification.

In some embodiments, a target data party selection system 100 for distributed model training includes a first data party 110, a second data party 120, a server 130, a task party 140, and a network 150. In some embodiments, a plurality of data parties, a server, and a task party constitute participants of distributed model training. The first data party 110 can be understood as a first training member, and includes a processing device 110-1 and a storage device 110-2. The second data party 120 can be understood as a second training member, and includes a processing device 120-1 and a storage device 120-2. The training member holds a training sample or training data, and can locally perform model training based on the data held by the training member, upload model training data (for example, a local model parameter or gradient information) to the server, obtain an updated model parameter of a target model from the server, and then continue to locally perform model training based on the updated model parameter of the target model. As such, through a plurality of iterations, the trained target model is obtained through cooperation with other participants. The server 130 includes a processing device 130-1 and a storage device 130-2. In some embodiments, the server 130 holds no training data, and is mainly configured to cooperate with each data party to update a parameter of the to-be-trained target model, or to select a target data party from a plurality of data parties based on task information published by the task party to train the target model. In some embodiments, the server 130 can hold training data, and participate in model training as a training member if necessary. In some embodiments, the task party 140 can hold no training data, or training data held by the task party 140 is not suitable for training the target model needed by the task party 140. The task party 140 can publish only a training task and provide training rewards, to obtain the target model obtained by other training members in cooperation with the server. It is worthwhile to note that FIG. 1 is merely an example for description. There can be two training members in FIG. 1. In other embodiments, there can be further a third party training member, a fourth party training member, . . . , an Nth party training member, etc.

Processing devices such as processing devices 110-1, 120-1, 130-1, and 140-1 of the parties in FIG. 1 can perform data and/or instruction processing to implement the example methods in the present specification. For example, the processing device 110-1 of the first data party 110 can train a to-be-pretrained model based on a training sample held by the processing device 110-1 to obtain a trained pre-trained model. The processing device 130-1 of the server 130 can test a pre-trained model uploaded by each training member to obtain a second performance parameter.

Storage devices such as storage devices 110-2, 120-2, 130-2, and 140-2 of the parties in FIG. 1 can store data and/or instructions to be executed/used by the corresponding processing devices. For example, each of the storage devices 110-2 and 120-2 can be configured to store the training sample. For another example, the storage device 140-2 can store the obtained target model.

The network 150 can facilitate exchange of information and/or data. In some embodiments, one or more components (for example, the first data party 110, the second data party 120, the server 130, and the task party 140) in the target data party selection system 100 can send information and/or data to another component in the system 100 through the network 150. For example, the second data party 120 can obtain information about the to-be-trained target model from the server 130 through the network 150. For another example, the server 130 can obtain the pre-trained model and a first performance parameter of the pre-trained model from each data party through the network. In some embodiments, the network 150 can be a wired or wireless network in any form or any combination thereof.

Figure 2:
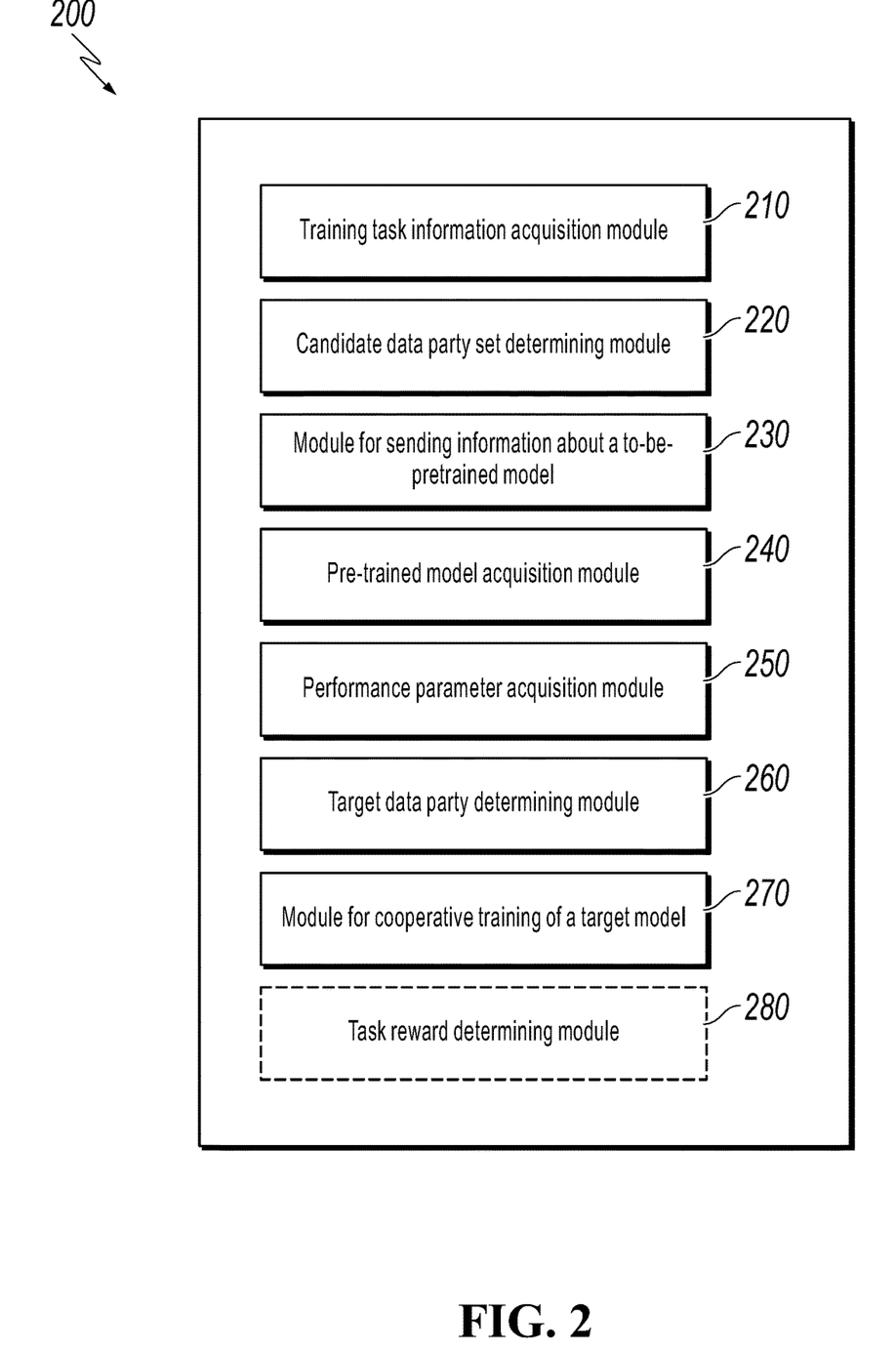
FIG. 2 is a block diagram illustrating a target data party selection system for distributed model training, according to some embodiments of the present specification.

FIG. 2 is a block diagram illustrating a target data party selection system for distributed model training, according to some embodiments of the present specification.

In some embodiments, the system 200 is implemented by a server in participants. The participants include a plurality of data parties, a task party, and the server. The system 200 can include a training task information acquisition module 210, a candidate data party set determining module 220, a module 230 for sending information about a to-be-pretrained model, a pre-trained model acquisition module 240, a performance parameter acquisition module 250, a target data party determining module 260, and a module 270 for cooperative training of a target model.

The training task information acquisition module 210 can be configured to obtain training task information from the task party. The training task information includes information about a to-be-pretrained model and information about a to-be-trained target model.

The candidate data party set determining module 220 can be configured to receive a task acceptance indication from at least one of the plurality of data parties, to obtain a candidate data party set. The candidate data party set includes a data party that sends the task acceptance indication.

The module 230 for sending information about a to-be-pretrained model can be configured to send the information about the to-be-pretrained model to each data party in the candidate data party set.

The pre-trained model acquisition module 240 can be configured to obtain a pre-trained model of each data party. The pre-trained model of each data party is obtained by each data party through model training based on a training sample held by the data party and the information about the to-be-pretrained model.

The performance parameter acquisition module 250 can be configured to obtain a performance parameter of each pre-trained model.

The target data party determining module 260 can be configured to determine one or more target data parties from the candidate data party set based on at least the performance parameter of each pre-trained model.

The module 270 for cooperative training of a target model can be configured to send the information about the to-be-trained target model to each target data party, to obtain the target model through cooperative training with each target data party.

In some embodiments, the performance parameter acquisition module 250 is further configured to obtain a first performance parameter of a corresponding pre-trained model from a data party corresponding to each pre-trained model; test each pre-trained model based on a test set, and obtain a second performance parameter of each pre-trained model, where the test set includes a plurality of test samples; and obtain an overfitting parameter of each pre-trained model based on the first performance parameter and the second performance parameter of each pre-trained model. In some embodiments, the test samples in the test set are from one or more data parties, or the test set is from the task party.

In some embodiments, the target data party determining module 260 is further configured to determine the one or more target data parties from the candidate data party set based on the performance parameter of each pre-trained model and a performance screening threshold.

In some embodiments, the target data party determining module 260 is further configured to compare the performance parameter of each pre-trained model with the performance screening threshold; sort, in descending order, performance parameters of pre-trained models whose comparison results satisfy a predetermined condition; and determine data parties corresponding to the top N pre-trained models as the target data parties, where N is an integer greater than 0.

In some embodiments, the target data party determining module 260 is further configured to determine, based on description information of the training sample in the training task information and data description information of each data party that sends the task acceptance indication, whether the data party that sends the task acceptance indication is a data party in the candidate data party set.

In some embodiments, the system further includes a task reward determining module 280, and the task reward determining module 280 is configured to obtain a quantity of training samples used by each target data party for model training from the target data party; and determine a task reward for each target data party based on the quantity of training samples of each target data party and a total task reward.

It should be understood that the system and the modules in the system in one or more implementations of the present specification can be implemented in various ways. For example, in some embodiments, the system and the modules in the system can be implemented by hardware, software, or a combination of software and hardware. A hardware part can be implemented by special logic. A software part can be stored in a memory and executed by an appropriate instruction execution system, for example, a microprocessor or dedicated design hardware. A person skilled in the art can understand that the method and system described above can be implemented by using computer-executable instructions and/or included in processor control code, for example, code provided on a carrier medium such as a magnetic disk, a CD, or a DVD-ROM, a programmable memory such as a read-only memory (firmware), or a data carrier such as an optical or electronic signal carrier. The system and the modules in the system in the present specification can be implemented by a hardware circuit of a very large scale integrated circuit or a gate array, a semiconductor such as a logic chip or a transistor, or a programmable hardware device such as a field programmable gate array or a programmable logic device, or can be implemented by software executed by, for example, various types of processors, or can be implemented by a combination of the previously described hardware circuit and software (for example, firmware).

It is worthwhile to note that the previous description of the processing devices and the modules of the processing devices is merely for ease of description, and does not limit the present specification to the scope of the example embodiments. It can be understood that after understanding the principle of the system, a person skilled in the art can randomly the modules or form a subsystem to connect to other modules without departing from this principle.

Figure 3:
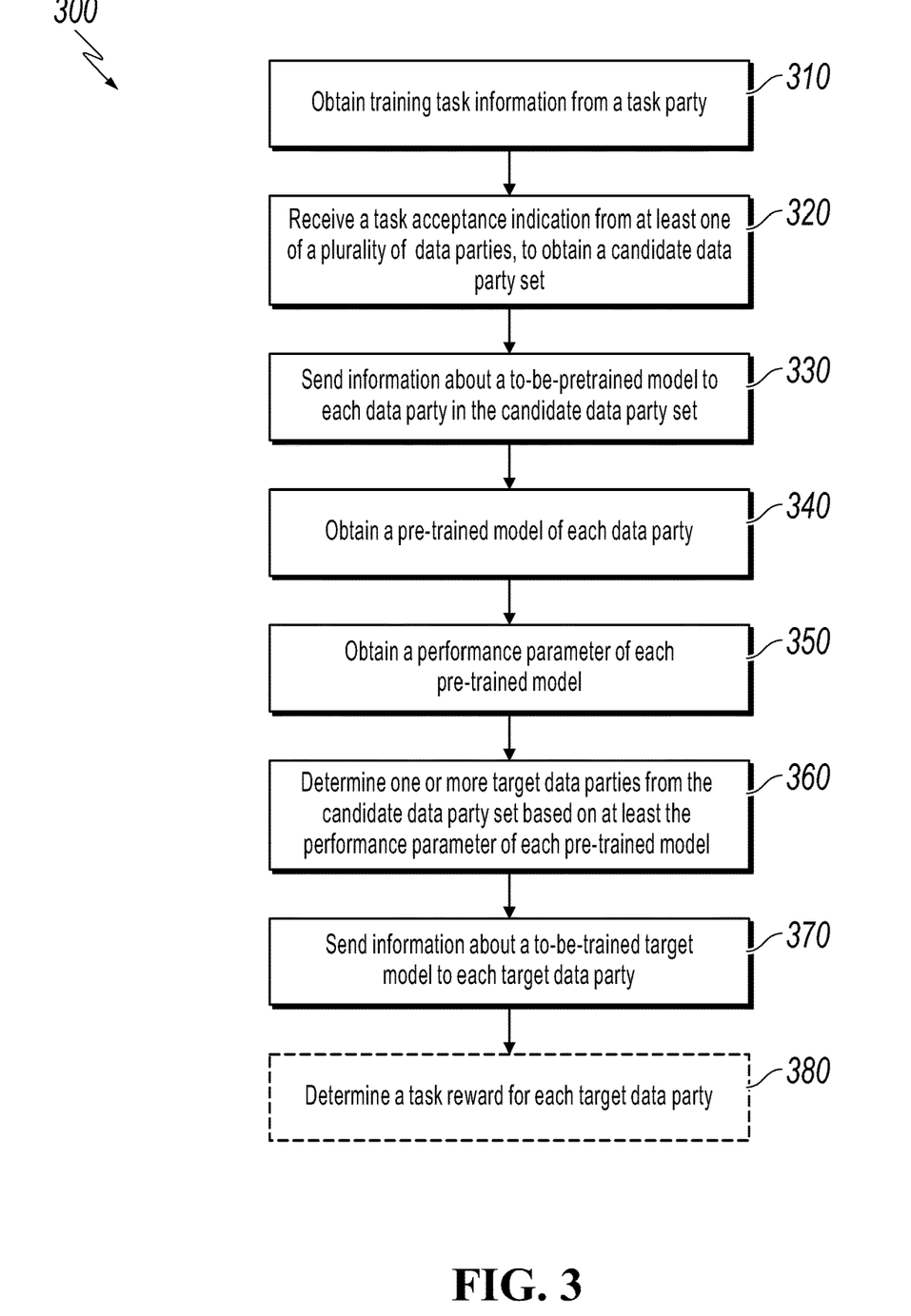
FIG. 3 is an example flowchart illustrating a target data party selection method for distributed model training, according to some embodiments of the present specification.

FIG. 3 is an example flowchart illustrating a target data party selection method for distributed model training, according to some embodiments of the present specification. In some embodiments, a procedure 300 can be performed by a server (for example, a processing device of the server 130). For example, the procedure 300 can be further implemented by the system 200 disposed at the server.

Step 310: Obtain training task information from a task party. In some embodiments, step 310 is performed by the training task information acquisition module 210.

The training task information acquisition module 210 can obtain the training task information from the task party. The training task information is information that each data party needs to know or use when participating in distributed model training. The training task information can be a model training task proposed by the task party based on its own service needs, and can specifically include information about a to-be-pretrained model and information about a to-be-trained target model. In some embodiments, the task party can send the training task information to the server and each data party through a network.

In some embodiments, the information about the to-be-pretrained model is parameter information, of the to-be-pretrained model, provided by the task party during pre-training, and includes but is not limited to one or a combination of a structure of the to-be-pretrained model $M_0$, an initialization parameter of the to-be-pretrained model $M_0$, a loss function, an initial learning rate, a regularization coefficient, and other hyperparameters. In some embodiments, the to-be-pretrained model is mainly used to check whether a training sample of a data party is suitable for training the target model. Therefore, the to-be-pretrained model can be a "simplified version" of the to-be-trained target model. By way of example only, the to-be-trained target model is a neural network model. The to-be-pretrained model includes fewer neurons or intermediate layers (hidden layers) than the to-be-trained target model, for example, includes fewer convolutional layers or pooling layers. In some embodiments, the training task information can specify only structure information of the to-be-pretrained model, for example, a model type or a network structure included in the model, a model parameter scale, etc. In some other embodiments, the training task information can specify an initialization parameter of the to-be-pretrained model. It is easy to understand that by stipulating that data parties participating in pre-training perform pre-training on the same initial model based on training samples held by the data parties, it is more convenient to compare performance of pre-trained models obtained by the data parties through training.

In some embodiments, the information about the to-be-trained target model is information, about the to-be-trained target model, provided by the task party during formal training, and includes but is not limited to one or a combination of a structure and an initialization parameter of the to-be-trained target model, a loss function, an initial learning rate, a regularization coefficient, and other hyperparameters.

In some embodiments, the training task information can further include a total task reward. The total task reward refers to the sum of rewards that can be received by all data parties that actually participate in and complete current distributed model training. In other words, the total task reward is costs that the task party is willing to spend for training the target model. In some embodiments, the task reward can be any resource beneficial to the data party, for example, bonuses, other useful data resources, or other eligibility criteria. In some embodiments, the server can issue a corresponding task reward based on the contribution of each data party to the training of the target model. For more details about the task reward issued by the server in proportion to the specific performance of each data party, references can be made to related description of step 380 in FIG. 3. Details are omitted here for simplicity.

In some embodiments, the training task information can further include description information, of the training sample, provided by the task party, to characterize requirements of the task party on the training sample. The description information of the training sample can include one or a combination of a training sample type requirement, a training sample feature requirement, a training sample label requirement, a training sample data amount requirement, etc. The training sample type requirement can include a type such as image data, audio data, or text data. The training sample feature requirement can include a training sample feature type such as gender, occupation, or age. The training sample label requirement can include a category to which the training sample belongs. By way of example only, for a training task that relates to face recognition (user identity information is determined based on a face image), the task party can specify that the label of the training sample should include identity information. The training sample data amount requirement can specify sample data for training. There can be 1000 pieces, 5000 pieces, etc. of sample data.

In some embodiments, the training task information can further include a performance screening threshold. The performance screening threshold can be used to determine one or more target data parties from a candidate data party set. For further description of the performance screening threshold, references can be made to corresponding description in step 360. Details are omitted here for simplicity.

Step 320: Receive a task acceptance indication from at least one of a plurality of data parties, to obtain a candidate data party set. In some embodiments, step 320 is performed by the candidate data party set determining module 220.

The candidate data party set determining module 220 can obtain the candidate data party set based on the task acceptance indication of each data party. For example, the candidate data party set determining module 220 can group together all data parties intended to participate in training of the target model, to form the candidate data party set.

In some embodiments, the candidate data party set determining module 220 can alternatively screen each data party intended to participate in training of the target model, and use a data party set obtained after screening as the candidate data party set. In some embodiments, when obtaining task acceptance indication information of each data party, the candidate data party set determining module 220 can also obtain data description information published by each data party. The data description information of the data party can be set according to the description information, of the training sample, provided by the task party, and the candidate data party set determining module 220 then can compare the data description information of each data party with the description information, of the training sample, provided by the task party, to select the candidate data party set that satisfies the requirements of the task party. For example, data party i publishes the task acceptance indication, and the requirement of the task party on the training sample is that a data type of the training sample is a picture. However, a training sample of training member i is in a text format, and therefore it is determined that training member i cannot enter the candidate data party set.

It is worthwhile to note that the description information, of the training sample, provided by the task party can be understood as the requirement of the task party on the training sample, and the data description information of the data party can be understood as description of a data status provided by the data party.

In some embodiments, each data party can publish the data description information to other parties (for example, the server 130, a task party 140, and other data parties) in a system 100 through the network in advance. As such, the data party can directly understand the training task information and determine whether to participate in the task.

In some embodiments, the data party can further publish a method for participating in the task to other participants in the system 100, including, for example, whether there is a need to wait for a permission verification procedure within the data party when distributed model training is performed by using the training sample provided by the data party, a lower reward limit that the data party can receive, or a time period during which the data party can participate in the task. The server can further perform distributed model training or reward determining based on the method for participating in the task by the data party. In addition, the server can determine, based on this, whether the data party enters the candidate data party set.

Through the above settings, the server can preliminarily screen the data parties, and directly screen out a data party that fails to satisfy a condition for participating in the task, to ensure that the task can be completed smoothly.

Step 330: Send the information about the to-be-pretrained model to each data party in the candidate data party set. In some embodiments, step 330 is performed by the module 230 for sending information about a to-be-pretrained model.

The module 230 for sending information about a to-be-pretrained model can send the information that is about the to-be-pretrained model and obtained in step 310 to each data party in the candidate data party set.

Step 340: Obtain a pre-trained model of each data party. In some embodiments, step 310 is performed by the pre-trained model acquisition module 240.

Assume that data parties c, i, and k are data parties (namely, data parties in the candidate data party set) corresponding to respective pre-trained models, and $M_c$, $M_i$, and $M_k$ are models respectively obtained by data parties c, i, and k by training the to-be-pre-trained model $M_0$ by using training samples held by data parties c, i, and k. In some embodiments, the pre-trained model acquisition module 240 can obtain the trained pre-trained model $M_c$, $M_i$, and $M_k$ of each data party in the candidate data party set. In some embodiments, the pre-trained model can be transmitted in the form of ciphertext. For example, each data party encrypts the pre-trained model by using a public key (for example, a model parameter for encrypting the pre-trained model) of the server, and the server receives the encrypted pre-trained model, and decrypts the pre-trained model by using a private key of the server.

Step 350: Obtain a performance parameter of each pre-trained model. In some embodiments, step 350 is performed by the performance parameter acquisition module 250.

Performance parameter S is a parameter used to measure the performance of the model. The performance parameter can include one or a combination of an error rate, precision, a precision ratio, a recall ratio, an AUC, ROC, etc.

In some embodiments, the performance parameter acquisition module 250 can obtain a first performance parameter $\dot{S}$ of a corresponding pre-trained model from a data party corresponding to each pre-trained model. First performance parameters corresponding to pre-trained models of the data parties can be respectively represented by using $\dot{S}_c$, $\dot{S}_i$, and $\dot{S}_k$, where the subscript represents the corresponding data party. In some embodiments, data parties c, i, and k can use some of the training samples held by data parties c, i, and k as a test set, and test the pre-trained models that are locally trained, to obtain first performance parameters $\dot{S}_c$, $\dot{S}_i$, and $\dot{S}_k$ corresponding to the pre-trained models.

In some embodiments, the performance parameter acquisition module 250 can test the pre-trained models $M_c$, $M_i$, and $M_k$ based on predetermined test set X, to obtain second performance parameters $\tilde{S}_c$, $\tilde{S}_i$, and $\tilde{S}_k$ of the pre-trained models. Test set X includes a plurality of test samples.

In some embodiments, the test samples in test set X can be from one or more data parties. In the embodiment of this scenario, each of data parties c, i, and k corresponding to the pre-trained models sends some of the samples held by data parties c, i, and k to the server, and then a union set of samples sent by all the data parties is collected to obtain test set X. Through this setting, the diversity and randomness of the test samples in test set X can be improved, and therefore the accuracy of the second performance parameter $\tilde{S}$ can be improved.

In some embodiments, the test samples in test set X can be from samples provided by the task party. In some alternative embodiments, the test samples in test set X can be from a union set of samples provided by the task party and the samples provided by data parties c, and k corresponding to the pre-trained models.

In some embodiments, the server can determine the first performance parameter or the second performance parameter of each pre-trained model as the performance parameter of the pre-trained model. In some other embodiments, the server can perform an operation on the first performance parameter and the second performance parameter of each pre-trained model to obtain the performance parameter of the pre-trained model.

Step 360: Determine one or more target data parties from the candidate data party set based on at least the performance parameter of each pre-trained model. In some embodiments, step 310 is performed by the target data party determining module 260.

In some embodiments, the target data party determining module 260 can determine the one or more target data parties from the candidate data party set based on the performance screening threshold. The performance screening threshold ε is provided by the task party and is used to measure whether the performance of the pre-trained model obtained by the data party through training satisfies a predetermined requirement of the task party. In some embodiments, there can be a plurality of performance screening thresholds ε, for example, $\varepsilon_1, \varepsilon_2, \ldots,$ and $\varepsilon_n$.

In some embodiments, the target data party determining module 260 can determine a data party whose performance parameter satisfies the performance screening threshold ε as the target data party. In the embodiment of this scenario, the target data party determining module 260 can respectively compare the performance parameter of each pre-trained model with the performance screening threshold. A performance parameter $S_k$ corresponding to data party k is used as an example. If the performance parameter corresponding to data party k satisfies a threshold $\varepsilon_1$ (for example, $S_k \geq \varepsilon_1$), it indicates that data party k satisfies the predetermined requirement of the task party, and data party k can be determined as the target data party.

It is worthwhile to note that a relationship between the performance parameter $S_k$ and the performance screening threshold ε can be specifically set based on an implementation scenario. For example, the predetermined requirement of the task party can be any relationship (for example, $S_k < \varepsilon$) between the performance parameter $S_k$ and the performance screening threshold ε.

In some embodiments, the performance parameter $S_k$ corresponding to data party k can be any one of the first performance parameter $\dot{S}_k$, the second performance parameter $\tilde{S}_k$, or a result obtained by performing an operation on the above two parameters $\dot{S}_k$ and $\tilde{S}_k$ by using any equation or function. The equation or function includes but is not limited to summation, averaging, weighted averaging, a difference, a variance, etc. By way of example only, the target data party determining module 260 can obtain an overfitting parameter μ of each pre-trained model based on the first performance parameter and the second performance parameter of each pre-trained model.

In the representations agreed upon in the present specification, an overfitting parameter $\mu_k$ of training member k can be expressed as follows:

$$\mu_k = |\tilde{S}_k - \dot{S}_k|.$$

A difference between the first performance parameter $\dot{S}_k$ and the second performance parameter $\tilde{S}_k$ can reflect an overfitting degree of the model. A larger overfitting parameter $\mu_k$ indicates a larger performance gap of the model $M_k$ for different test sets and a poorer generalization capability of the model $M_k$.

In some embodiments, it can be set that when $\mu_k \leq \varepsilon_2$, data party k satisfies the predetermined requirement of the task party.

In some embodiments, only when the performance parameters of data party k satisfy a plurality of performance screening thresholds $\varepsilon_1, \varepsilon_2, \ldots,$ and $\varepsilon_n$, data party k can be determined as the target task party. For example, only when $\dot{S}_k \geq \varepsilon_1$ and $\mu_k \leq \varepsilon_2$, data party k is considered to satisfy the requirement of the task party.

In some embodiments, the target data party determining module 260 can further sort data parties that satisfy the performance screening threshold ε condition in descending order of performance parameters of pre-trained models of the data parties, and select the top N data parties as the target data parties, where N is an integer greater than 0. For example, there are 100 data parties that satisfy the performance screening threshold ε condition, and N is set to 10. In this case, the target data party determining module 260 determines the top 10 data parties as the target data parties to participate in training of the to-be-trained target model.

In some alternative embodiments, the target data party determining module 260 can directly sort performance parameters corresponding to the data parties in descending order without performing threshold screening on the performance parameters corresponding to the data parties, and select data parties corresponding to the top N pre-trained models as the target data parties.

Step 370: Send the information about the to-be-trained target model to each target data party. In some embodiments, step 370 is performed by the module 270 for cooperative training of a target model.

In some embodiments, the module 270 for cooperative training of a target model can send the information about the to-be-trained target model to each target data party based on the target data party determined in step 360, and each target data party performs cooperative training to obtain an updated target model.

Optionally, the procedure 300 can further include step 380 of determining a task reward for each target data party. In some embodiments, step 380 is performed by the task reward determining module 280.

In some embodiments, when the training task information includes total task reward information R, the task reward determining module 280 can determine a reward issued to each target data party that completes model training. For example, the task reward determining module 280 can determine a reward coefficient for each target data party, and determine, based on the reward coefficient and a total reward value, the reward issued to each target data party.

In some embodiments, the reward coefficient for each target data party can be measured based on a quantity of samples used by each target data party to participate in cooperative training. Specifically, each target data party can send the quantity of samples used by the target data party to participate in cooperative training to the server, and the server determines the reward coefficient for each target data party based on sample data of each target data party and the total samples amount of the data parties. For example, assume that a quantity of used training samples corresponding to a first target data party is $n_1$, a quantity of used training samples corresponding to a second target data party is $n_2$, and a quantity of used training samples corresponding to a kth target data party is $n_k$.

In the representations agreed upon in the present specification, a reward coefficient $\rho_i$ corresponding to target data party i can be expressed as follows:

$$\rho_i = \frac{n_i}{\sum_{i=1}^{k} n_i}.$$

Here, $\rho_i$ is the reward coefficient corresponding to data party i.

In the representations agreed upon in the present specification, a reward received by target data party i can be expressed as follows:

$$c_i = \rho_i R$$

Here, $c_i$ is the reward received by data party i.

Through this setting, each target data party participating in training can receive a task reward based on a respective reward coefficient. The reward coefficient is directly proportional to the quantity of training samples used by the data party, and therefore the problem that the server improperly allocates a reward to a data party with a larger contribution can be resolved.

It is worthwhile to note that a person skilled in the art can make various reasonable changes to the task reward determining method in the present specification based on step 380. In some embodiments, the reward coefficient can be set based on the contribution of each target data to a model training effect. For example, if a model effect obtained by all the target data parties through training is m, and a model effect obtained after target data party i is removed is $n_i$ (contribution level $m_i$ of target data party i is equal to m−$n_i$), the reward coefficient of target data party i can be $m_i$/m. For another example, the reward coefficient can be specifically set based on a quantity of operations (a computing power demand) performed by the server or power consumption of each target data party. Such a variation still falls within the protection scope of the present application.

In some embodiments, the quantities $n_1, \ldots, n_i, \ldots,$ and $n_j$ that are of training samples of the data parties and obtained by the server can be encrypted. In some embodiments, training member i sends the quantity $n_i$ of training samples to the server through encryption. For example, the quantity $n_i$ of training samples is encrypted by using a key. For another example, the quantity $n_i$ of training samples is encrypted through secret sharing.

For example, secret sharing is used, and each training member can split its own quantity of training samples to obtain a plurality of, for example, k data fragments. By way of example only, training member i splits its own quantity $n_i$ of training samples to obtain k data fragments, and a summation result of the data fragments is equal to the quantity $n_i$ of training samples. Training member i sends its own k−1 data fragments to other k−1 training members, obtains data fragments from the other k−1 training members, and then splices the reserved data fragment from its own quantity $n_i$ of training samples and the data fragments from the other k−1 training members in a predetermined order to obtain spliced data fragments in the form of ciphertext. For example, data fragments of different training members are spliced from top to bottom or from left to right based on numbers of the training members. Finally, training member i transmits the spliced data fragments to the server. After obtaining the spliced data fragments in the form of ciphertext from the k training members, the server performs summation on the spliced data fragments to obtain a total quantity n of training samples.

In some embodiments, the server can send the determined task reward for each target data party to the task party, so that the task party delivers the reward to each target data party after obtaining the trained target model. In some embodiments, the task party can deliver the total reward to the server after obtaining the trained target model, and the server completes delivery based on the task reward for each target data party.

It is worthwhile to note that the above description of the procedure 300 is merely an example and illustrative, and does not limit the scope of application of the present specification. A person skilled in the art can make various modifications and changes to the procedure 300 under the guidance of the present specification. However, these modifications and changes still fall within the scope of the present specification.

Figure 4:
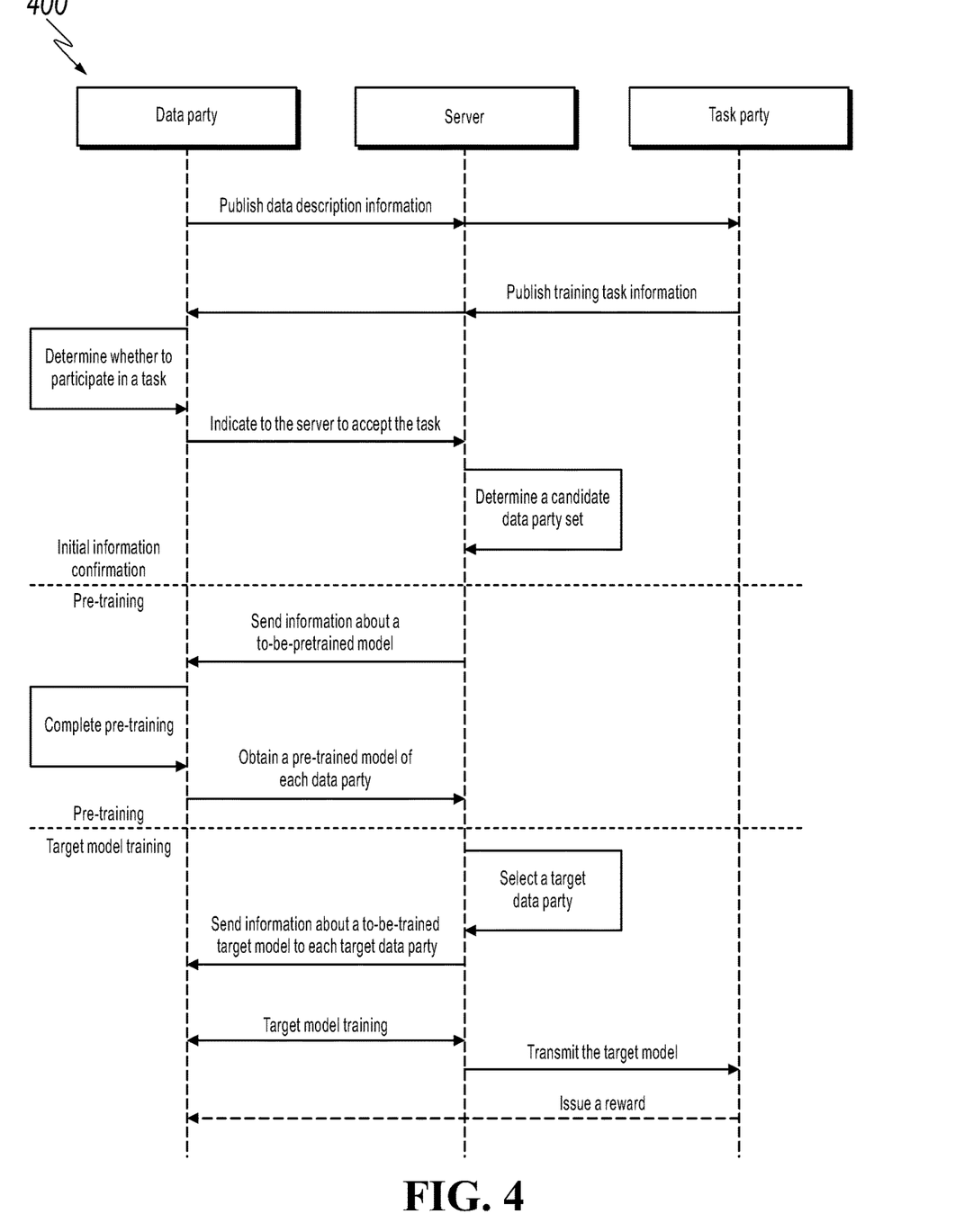
FIG. 4 is a schematic interaction diagram illustrating a target data party selection method for distributed model training, according to some embodiments of the present specification.

FIG. 4 is a schematic interaction diagram illustrating a target data party selection method 400 for distributed model training, according to some embodiments of the present specification.

As shown in FIG. 4, in a specific embodiment, the target data party selection method for distributed model training is implemented by exchanging data between a server, a task party, and data parties. In FIG. 4, the entire data exchange process is divided into an initial information confirmation process, a pre-training process, and a target model training process.

The initial information confirmation process is performed first. The initial information confirmation process is a process in which the server, the task party, and the data parties exchange data held by the server, the task party, and the data parties. In this process, candidate data parties that are to participate in pre-training can be determined, and the following steps are included:

The task party confirms a task. The task can be training task information. After confirming the task, the task party can publish the task to the server and the data parties.

Each data party can arrange and confirm its own data information, and send data description information to each participant.

Each data party then determines, based on the training task information, whether to participate in the task, and indicates to the server to accept the task.

The server can screen data information of data parties intended to participate in the task, to determine a candidate data party set.

So far, the initial information confirmation process of the entire procedure is completed. The pre-training process of the entire procedure is then entered:

The server sends information about a to-be-pretrained model in the training task information to each candidate data party. Each candidate data party trains the to-be-pretrained model $M_0$ based on locally stored training samples, to obtain a corresponding pre-trained model.

The server obtains the pre-trained model $M_c$, $M_i$, and $M_k$ of each data party. In some embodiments, the server further obtains a first performance parameter uploaded by each data party.

So far, the pre-training process of the entire procedure is completed. The target model training process of the entire procedure is then entered:

The server selects a target data party. In some embodiments, the server can screen each data party in the candidate data party set based on a performance parameter of the pre-trained model $M_c$, $M_i$, and $M_k$ of each data party, to determine one or more target data parties.

After selecting the target data party, the server can send information that is about a to-be-trained target model and obtained from the task party to each target data party.

Each target data party performs cooperative training on the to-be-trained target model based on its own training samples to obtain the target model.

After training is completed, the server uploads the trained target model to the task party.

The task party issues a reward. The task party can issue, based on a reward coefficient, a corresponding reward to all target data parties that complete model training.

The following uses federated learning as an example to describe a process of cooperatively training the target model by a plurality of target data parties. Assume that participants in training of a federated learning model include at least one server and k target data parties. The target data party is a data holder participating in training of the federated learning model. The server sends the information about the to-be-trained target model to the plurality of target data parties, and the plurality of target data parties perform model training based on the information about the to-be-trained target model and training samples held by the target data parties, to obtain a model after training (for example, after training performed by using a batch of training samples, where the batch of training samples can include a plurality of training samples, for example, 100), and then the plurality of target data parties upload model training data (for example, model parameters or gradient information obtained through training) to the server, so that the server can update a model parameter of the target model based on the training data. The server then can send the updated model parameter of the target model to each target data party, and the target data party performs model training on the updated target model again by using training data held by the target data party. As such, after a plurality of iterations, each participant can finally obtain the trained target model.

Possible beneficial effects of the embodiments of the present specification include but are not limited to the following: (1) A pre-training method is used for training for a plurality of data parties to obtain performance parameters of pre-trained models corresponding to the plurality of data parties, so as to select an appropriate data party for training of the target model, thereby effectively improving the performance of the target model. (2) It can make the task party that holds no data participate in distributed model training and enjoy the training result. In addition, additional benefits are brought to the data party. Therefore, data resources are fully used. It is worthwhile to note that different embodiments may produce different beneficial effects. In different embodiments, the possible beneficial effects can be any one or a combination of the above beneficial effects or any other beneficial effects that may be obtained.

The basic concepts are described above. It is clear for a person skilled in the art that the detailed disclosure above is merely an example and constitutes no limitation on the present specification. Although it is not explicitly stated here, a person skilled in the art may make various modifications, improvements, and amendments to the present specification. Such modifications, improvements, and amendments are proposed in the present specification, and therefore such modifications, improvements, and amendments still fall within the spirit and scope of the example embodiments of the present specification.

In addition, specific words are used in the present specification to describe the embodiments of the present specification. For example, "one embodiment", "an embodiment", and/or "some embodiments" mean a certain feature, structure, or characteristic related to at least one embodiment of the present specification. Therefore, it should be emphasized and it is worthwhile to note that "an embodiment", "one embodiment", or "one alternative embodiment" mentioned twice or more in different positions in the present specification does not necessarily refer to the same embodiment. In addition, certain features, structures, or characteristics in one or more embodiments of the present specification can be appropriately combined.

Furthermore, a person skilled in the art can understand that aspects of the present specification can be described by several patentable classes or circumstances, including any new and useful combination of processes, machines, products, or substances, or any new and useful improvements thereof. Correspondingly, the aspects of the present specification can be executed entirely by hardware, can be executed entirely by software (including firmware, resident software, microcode, etc.), or can be executed by a combination of hardware and software. The above hardware or software can be referred to as a "data block", a "module", an "engine", a "unit", a "component", or a "system". In addition, the aspects of the present specification may be embodied as a computer product located in one or more computer-readable media, and the product includes computer-readable program code.

A computer storage medium may include a propagated data signal that includes computer program code, for example, on a baseband or as part of a carrier. The propagated signal may be in a plurality of forms, including an electromagnetic form, a light form, or a suitable combination of forms. The computer storage medium can be any computer-readable medium other than a computer-readable storage medium. The medium can be connected to an instruction execution system, apparatus, or device to communicate, propagate, or transmit programs for use. Program code located on the computer storage medium can be propagated through any suitable medium, including radio, a cable, a fiber-optic cable, RF, a similar medium, or any combination thereof.

The computer program code needed for the operation of each part of the present specification can be written in any one or more programming languages, including object-oriented programming languages such as Java, Scala, Smalltalk, Eiffel, JADE, Emerald, C++, C#, VB.NET, and Python, conventional programming languages such as C language, VisualBasic, Fortran2003, Perl, COBOL2002, PHP, and ABAP, dynamic programming languages such as Python, Ruby, and Groovy, other programming languages, etc. The program code can completely run on a user computer, or run on a user computer as an independent software package, or partly run on a user computer and partly run on a remote computer, or completely run on a remote computer or processing device. In the latter case, the remote computer can be connected to a user computer through any form of network such as a local area network (LAN) or a wide area network (WAN), or connected to an external computer (for example, through the Internet), or in a cloud computing environment, or used as a service, for example, software as a service (SaaS).

In addition, unless it is explicitly stated in claims, the order of the processing elements and sequences, use of numbers and letters, or use of other names in the present specification are not intended to limit the order of the procedures and methods in the present specification. Although some embodiments of the invention that are currently considered useful are described by using various examples in the above disclosure, it should be understood that such details are merely for the purpose of illustration, and the additional claims are not limited to the disclosed embodiments. On the contrary, the claims are intended to cover all modifications and equivalent combinations in line with the spirit and scope of the embodiments of the present specification. For example, although the system components described above can be implemented by hardware devices, the system components can be implemented by only software solutions, for example, installing the described system on an existing processing device or mobile device.

Similarly, it is worthwhile to note that to simplify the description disclosed in the present specification and facilitate understanding of one or more embodiments of the invention, a plurality of features are sometimes incorporated into one embodiment, one accompanying drawing, or the description thereof in the previous description of the embodiments of the present specification. However, this disclosure method does not mean that the subject of the present specification requires more features than those in the claims. Actually, the features of the embodiments are less than all of the features of the individual embodiments disclosed above.

In some embodiments, numbers describing the number of components and attributes are used. It should be understood that such numbers used in the description of the embodiments are modified by the modifiers "about", "approximately", or "substantially" in some examples. Unless otherwise stated, "about", "approximately", or "substantially" indicates that a ±20% change in the number is allowed. Correspondingly, in some embodiments, the numerical parameters used in the specification and claims are approximate values, and the approximate valuescan vary with the characteristics needed by individual embodiments. In some embodiments, for the numerical parameters, specified significant digits should be taken into account, and a general digit retention method is used. Although the numerical ranges and parameters used in some embodiments of the present specification to confirm the breadth of their ranges are approximate values, in specific embodiments, such values are set as precisely as possible within a feasible range.

The entire contents of each patent, a patent application, a patent application publication, and other materials such as articles, books, specifications, publications, and documents cited in the present specification are hereby incorporated herein by reference. Application history documents inconsistent with or conflicting with the contents of the present specification shall be excluded, as well as documents (currently or subsequently appended to the present specification) that limit the broadest scope of the claims in the present specification. It is worthwhile to note that if the use of description, definitions, and/or terms in the materials attached to the present specification is inconsistent with or in conflict with the content of the present specification, the use of description, definitions, and/or terms in the present specification shall prevail.

Finally, it should be understood that the embodiments of the present specification are intended only to describe the principles of the embodiments of the present specification. Other variations may also fall within the scope of the present specification. Therefore, by way of example instead of limitation, alternative configurations of the embodiments of the present specification can be considered to be consistent with the instructions of the present specification. Correspondingly, the embodiments of the present specification are not limited to the embodiments explicitly described and illustrated in the present specification.

What is claimed is:

1. A computer-implemented method, comprising:
    obtaining, by a server, training task information from a task party, wherein the training task information comprises information about a to-be-pretrained model and information about a to-be-trained target model;
    receiving, by the server, a respective task acceptance indication from each of at least one of a plurality of data parties, to obtain a candidate data party set;
    sending, by the server, the information about the to-be-pretrained model to each data party in the candidate data party set;
    receiving, by the server, a respective pre-trained model of each data party, wherein the respective pre-trained model of each data party is obtained by each data party through model training based on respective training samples of each data party and the information about the to-be-pretrained model;
    obtaining, for each data party, a respective first performance parameter of the respective pre-trained model of a respective data party;
    testing, for each data party, the respective pre-trained model based on a test set, and obtaining a respective second performance parameter of the respective pre-trained model, wherein the test set comprises a plurality of test samples;
    obtaining, for each data party, a respective overfitting parameter of the respective pre-trained model based on the respective first performance parameter and the respective second performance parameter of the respective pre-trained model;
    determining one or more target data parties from the candidate data party set based on at least the respective overfitting parameter of the respective pre-trained model, wherein each target data party of the one or more target data parties participates in distributed model training to obtain a target model; and
    sending the information about the to-be-trained target model to each target data party of the one or more target data parties, to obtain the target model through cooperative training among the one or more target data parties.

2. The computer-implemented method of claim 1, wherein the plurality of test samples in the test set are from one or more data parties, or the test set is from the task party.

3. The computer-implemented method of claim 1, wherein the training task information further comprises a performance screening threshold, and wherein the determining one or more target data parties from the candidate data party set based on at least the respective overfitting parameter of the respective pre-trained model comprises:
    determining the one or more target data parties from the candidate data party set based on the respective overfitting parameter of the respective pre-trained model and the performance screening threshold.

4. The computer-implemented method of claim 3, wherein determining the one or more target data parties from the candidate data party set based on the respective overfitting parameter of the respective pre-trained model and the performance screening threshold comprises:
    comparing the respective overfitting parameter of the respective pre-trained model with the performance screening threshold;
    sorting, in descending order, overfitting parameters of pre-trained models whose comparison results satisfy a predetermined condition; and
    determining, as the one or more target data parties, data parties corresponding to a first N pre-trained models associated with a first N sorted overfitting parameters, wherein N is an integer greater than 0.

5. The computer-implemented method of claim 1, wherein the training task information further comprises a total task reward.

6. The computer-implemented method of claim 5, further comprising:
obtaining, from each target data party, a respective quantity of training samples used for model training; and
determining a respective task reward for each target data party based on the respective quantity of training samples of each target data party and the total task reward.

7. The computer-implemented method of claim 1, wherein the training task information further comprises description information of the respective training samples of each data party in the candidate data party set, wherein the method further comprises receiving data description information of the plurality of data parties from the plurality of data parties, and
wherein receiving, by the server, a respective task acceptance indication from each of at least one of a plurality of data parties, to obtain a candidate data party set further comprises:
determining, based on the description information of the respective training samples in the training task information and data description information of each data party that sends the respective task acceptance indication, whether each data party that sends the respective task acceptance indication is a data party in the candidate data party set.

8. A non-transitory, computer-readable medium storing one or more instructions executable by a computer system to perform operations comprising:
obtaining, by a server, training task information from a task party, wherein the training task information comprises information about a to-be-pretrained model and information about a to-be-trained target model;
receiving, by the server, a respective task acceptance indication from each of at least one of a plurality of data parties, to obtain a candidate data party set;
sending, by the server, the information about the to-be-pretrained model to each data party in the candidate data party set;
receiving, by the server, a respective pre-trained model of each data party, wherein the respective pre-trained model of each data party is obtained by each data party through model training based on respective training samples of each data party and the information about the to-be-pretrained model;
obtaining, for each data party, a respective first performance parameter of the respective pre-trained model of a respective data party;
testing, for each data party, the respective pre-trained model based on a test set, and obtaining a respective second performance parameter of the respective pre-trained model, wherein the test set comprises a plurality of test samples;
obtaining, for each data party, a respective overfitting parameter of the respective pre-trained model based on the respective first performance parameter and the respective second performance parameter of the respective pre-trained model;
determining one or more target data parties from the candidate data party set based on at least the respective overfitting parameter of the respective pre-trained model, wherein each target data party of the one or more target data parties participates in distributed model training to obtain a target model; and
sending the information about the to-be-trained target model to each target data party of the one or more target data parties, to obtain the target model through cooperative training among the one or more target data parties.

9. The non-transitory, computer-readable medium of claim 8, wherein the plurality of test samples in the test set are from one or more data parties, or the test set is from the task party.

10. The non-transitory, computer-readable medium of claim 8, wherein the training task information further comprises a performance screening threshold, and wherein the determining one or more target data parties from the candidate data party set based on at least the respective overfitting parameter of the respective pre-trained model comprises:
determining the one or more target data parties from the candidate data party set based on the respective overfitting parameter of the respective pre-trained model and the performance screening threshold.

11. The non-transitory, computer-readable medium of claim 10, wherein determining the one or more target data parties from the candidate data party set based on the respective overfitting parameter of the respective pre-trained model and the performance screening threshold comprises:
comparing the respective overfitting parameter of the respective pre-trained model with the performance screening threshold;
sorting, in descending order, overfitting parameters of pre-trained models whose comparison results satisfy a predetermined condition; and
determining, as the one or more target data parties, data parties corresponding to a first N pre-trained models associated with a first N sorted overfitting parameters, wherein N is an integer greater than 0.

12. The non-transitory, computer-readable medium of claim 8, wherein the training task information further comprises description information of the respective training samples of each data party in the candidate data party set, wherein the operations further comprise receiving data description information of the plurality of data parties from the plurality of data parties, and
wherein receiving, by the server, a respective task acceptance indication from each of at least one of a plurality of data parties, to obtain a candidate data party set further comprises:
determining, based on the description information of the respective training samples in the training task information and data description information of each data party that sends the respective task acceptance indication, whether each data party that sends the respective task acceptance indication is a data party in the candidate data party set.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a server, training task information from a task party, wherein the training task information comprises information about a to-be-pretrained model and information about a to-be-trained target model;
receiving, by the server, a respective task acceptance indication from each of at least one of a plurality of data parties, to obtain a candidate data party set;

sending, by the server, the information about the to-be-pretrained model to each data party in the candidate data party set;

receiving, by the server, a respective pre-trained model of each data party, wherein the respective pre-trained model of each data party is obtained by each data party through model training based on respective training samples of each data party and the information about the to-be-pretrained model;

obtaining, for each data party, a respective first performance parameter of the respective pre-trained model of a respective data party;

testing, for each data party, the respective pre-trained model based on a test set, and obtaining a respective second performance parameter of the respective pre-trained model, wherein the test set comprises a plurality of test s ample s;

obtaining, for each data party, a respective overfitting parameter of the respective pre-trained model based on the respective first performance parameter and the respective second performance parameter of the respective pre-trained model;

determining one or more target data parties from the candidate data party set based on at least the respective overfitting parameter of the respective pre-trained model, wherein each target data party of the one or more target data parties participates in distributed model training to obtain a target model; and sending the information about the to-be-trained target model to each target data party of the one or more target data parties, to obtain the target model through cooperative training among the one or more target data parties.

14. The computer-implemented system of claim 13, wherein the plurality of test samples in the test set are from one or more data parties, or the test set is from the task party.

15. The computer-implemented system of claim 13, wherein the training task information further comprises a performance screening threshold, and wherein the determining one or more target data parties from the candidate data party set based on at least the respective overfitting parameter of the respective pre-trained model comprises:

determining the one or more target data parties from the candidate data party set based on the respective overfitting parameter of the respective pre-trained model and the performance screening threshold.

16. The computer-implemented system of claim 15, wherein determining the one or more target data parties from the candidate data party set based on the respective overfitting parameter of the respective pre-trained model and the performance screening threshold comprises:

comparing the respective overfitting parameter of the respective pre-trained model with the performance screening threshold;

sorting, in descending order, overfitting parameters of pre-trained models whose comparison results satisfy a predetermined condition; and determining, as the one or more target data parties, data parties corresponding to a first N pre-trained models associated with a first N sorted overfitting parameters, wherein N is an integer greater than 0.

17. The computer-implemented system of claim 13, wherein the training task information further comprises description information of the respective training samples of each data party in the candidate data party set, wherein the one or more operations further comprise receiving data description information of the plurality of data parties from the plurality of data parties, and wherein receiving, by the server, a respective task acceptance indication from each of at least one of a plurality of data parties, to obtain a candidate data party set further comprises:

determining, based on the description information of the respective training samples in the training task information and data description information of each data party that sends the respective task acceptance indication, whether each data party that sends the respective task acceptance indication is a data party in the candidate data party set.

* * * * *

UNITED STATES PATENT AND TRADEMARK OFFICE
CERTIFICATE OF CORRECTION

PATENT NO. : 11,449,805 B2
APPLICATION NO. : 17/498978
DATED : September 20, 2022
INVENTOR(S) : Longfei Zheng et al.

It is certified that error appears in the above-identified patent and that said Letters Patent is hereby corrected as shown below:

In the Claims

Column 1, Line 17, in Claim 13, delete "s ample s;" and insert -- samples; --.

Signed and Sealed this
Twenty-seventh Day of December, 2022

Katherine Kelly Vidal
*Director of the United States Patent and Trademark Office*